United States Patent [19]

Komatsuzaki

[11] Patent Number: 5,223,876
[45] Date of Patent: Jun. 29, 1993

[54] PHOTOGRAPHIC FILM CASSETTE AND CAMERA USING THE SAME

[75] Inventor: Hiroshi Komatsuzaki, Tokyo, Japan

[73] Assignee: Fuji Photo Film Co., Ltd., Kanagawa, Japan

[21] Appl. No.: 899,924

[22] Filed: Jun. 17, 1992

Related U.S. Application Data

[62] Division of Ser. No. 735,722, Jul. 25, 1991, Pat. No. 5,179,402.

[30] Foreign Application Priority Data

Jul. 27, 1990 [JP] Japan .................................. 2-80093
Aug. 6, 1990 [JP] Japan .................................. 2-83452

[51] Int. Cl.⁵ ........................................... G03B 17/26
[52] U.S. Cl. ................................. 354/275; 242/71.1
[58] Field of Search .................. 354/275; 242/71, 71.1, 242/71.2

[56] References Cited

U.S. PATENT DOCUMENTS

| | | | |
|---|---|---|---|
| 4,176,938 | 12/1979 | Weiss et al. | 354/275 |
| 4,363,547 | 12/1982 | Hashimoto et al. | 354/212 |
| 4,834,306 | 5/1989 | Robertson et al. | 242/71.1 |
| 4,841,319 | 6/1989 | Hansen | 354/275 |
| 4,846,418 | 7/1989 | Fairman | 242/71.1 |
| 4,875,638 | 10/1992 | Harvey | 242/71.1 |
| 5,115,268 | 5/1992 | Kitagawa et al. | 354/275 |

FOREIGN PATENT DOCUMENTS 62-26745  7/1987 Japan .
62-62330 12/1987 Japan .
62-62331 12/1987 Japan .
2-124564  5/1990 Japan .

Primary Examiner—Michael L. Gellner
Assistant Examiner—Howard B. Blankenship
Attorney, Agent, or Firm—Sughrue, Mion, Zinn, Macpeak & Seas

[57] ABSTRACT

A photographic film cassette which has not been exposed has its film leader completely housed within the cassette. When a film is rewound after taking photographs, a stop hole in the film is engaged with a stop claw formed on a film passage mouth, so that the film rewinding operation is intercepted, with the film leader being slightly protruded from the cassette shell. A film removing slit is formed in a film feeding slit of a cassette holder of a camera. Therefore, when pulling out the film cassette in the axial direction, the film leader protruded from the cassette is bent and passed through the slit. If an exposed film cassette is attempted to be loaded, the loaded operation is intercepted because the open end of the film removing slit is positioned different from the film feeding slit in the vertical direction. When the cassette holder takes a closed position, an operation pin registers at a first lock section so that the cassette holder is locked at the closed position where the cassette holder enters the camera body. As a coupling member is moved, the cassette holder moves from the closed position to the open position by the force of a biasing member. At this time, the operation pin moves through a first guide section from the first lock section to a second lock section, so that the cassette holder is locked at the open position where the cassette holder protrudes out of the camera body.

11 Claims, 7 Drawing Sheets

PHOTOGRAPHIC FILM CASSETTE AND CAMERA USING THE SAME

This is a divisional of application Ser. No. 07/735,722 filed Jul. 25, 1991, now U.S. Pat. No. 5,179,402.

BACKGROUND OF THE INVENTION

1. Field of the Invention

The present invention relates to a photographic film cassette of the type that the leading section of a photographic film strip is advanced out of the cassette by rotation of a spool, and to a camera using such a photographic film cassette.

2. Description of Related Art

There is known a photographic film cassette having the structure wherein a photographic film strip (hereinafter simply called a film) is entirely housed within the cassette, and a film leading section (called a film leader) is advanced via a film passage mouth out of the cassette by rotation of a spool (e.g., refer to U.S. Pat. Nos. 4,834,306 and 4,832,275, and Japanese Patent Laid-open Publication No. 2-124564). This film cassette, different from a conventional film cassette having a film leader protruded beforehand out of a film passage mouth, has advantages in that the film loading operation using the film leader does not require a certain amount of skill and manual dexterity.

Such a film cassette is used for a camera having a cassette holder described, for example, in U.S. Pat. No. 4,841,319. The cassette holder is formed with a cassette receiving chamber into which a film cassette is inserted in the axial direction. The cassette holder is arranged to swing or pivot between an open position where the cassette holder is pulled out of the camera body, and a closed position where the cassette holder enters into the camera body. It is necessary for the construction of such a swingable cassette holder to lock the cassette holder at both the open and closed positions. In this context, the camera described in the above-cited U.S. patent '319 has a stopper mounted on the camera body, the stopper protruding within the rotation locus of the cassette holder to stop the cassette holder at the open position.

Generally speaking, an exposed film is completely rewound on the cassette after taking photographs. Therefore, for the above-described film cassettes, it is impossible to visually discriminate between unused (unexposed) film cassettes and used (exposed) film cassettes. There arises therefore a risk of reloading an exposed film cassette into a camera.

The above-described camera has a stopper for stopping the cassette holder at the open position, the stopper being formed integrally with the camera body. Therefore, the stopper is likely to hinder the operation of mounting the cassette holder on the camera body, posing a problem of mounting operability. Furthermore, a mechanism for holding the cassette holder at the open position and a mechanism for locking it at the closed position are separately provided, thereby increasing the number of components.

SUMMARY OF THE INVENTION

It is therefore a principal object of the present invention to provide a photographic film cassette capable of visually recognizing if the film cassette has been exposed or not, by leaving the film leader out of the cassette while rewinding the film.

It is another object of the present invention to provide a camera capable of holding a cassette holder at the open position or the closed position using the same mechanism.

In order to achieve the above and other objects, the photographic film cassette of the present invention is constructed such that there is formed a stop hole between the end of a film leader and the first frame. A stop claw formed on the film passageway of the cassette engages with the stop hole while the exposed film is rewound on the spool, and the film rewinding is stopped with a part of the film leader being protruded out of the film passage mouth.

The photographic film cassette of this type is used with a camera which has a cassette holder capable of preventing a photographic film cassette with a protruded film leader from being loaded, and which allows unloading of a photographic film cassette with a film leader slightly protruded from the cassette. The cassette holder is formed with a cassette receiving chamber into which a film cassette is inserted in the axial direction. The cassette holder pivots between a closed position where the cassette holder is inserted in the camera body and an open position where the cassette holder protrudes out of the camera body. There is also formed a swing restricting means at the side of the cassette holder, the swing restricting means being engaged with a coupling member movable along the side of the camera body. The swing restricting means is provided with an arc guide section for allowing the cassette holder to swing, and a lock section connectedly formed to opposite ends of the guide section for holding the cassette holder at the closed position and open position by abutting with the coupling member.

According to the photographic film cassette of the present invention, it is possible to readily discriminate if the cassette has been used or not by checking if the film leader is protruded out of the cassette. It is not necessary to pull out the film leader from the cassette, as presently performed at laboratories. The swing restricting means has two functions, one is a guiding function to allow the cassette holder to swing, and the other is a locking function to prevent the cassette holder from swinging. As a result, separate mechanisms for performing the two functions are not required, thereby reducing the cost of the camera. Furthermore, a film feeding slit from which the film is advanced to the exposure stage is formed differently in position in the vertical direction from a film removing slit used for pulling out the film leader from the film feeding slit. Therefore, a used photographic film cassette can be reliably prevented from being loaded inadvertently, because the film leader hinders the loading operation.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
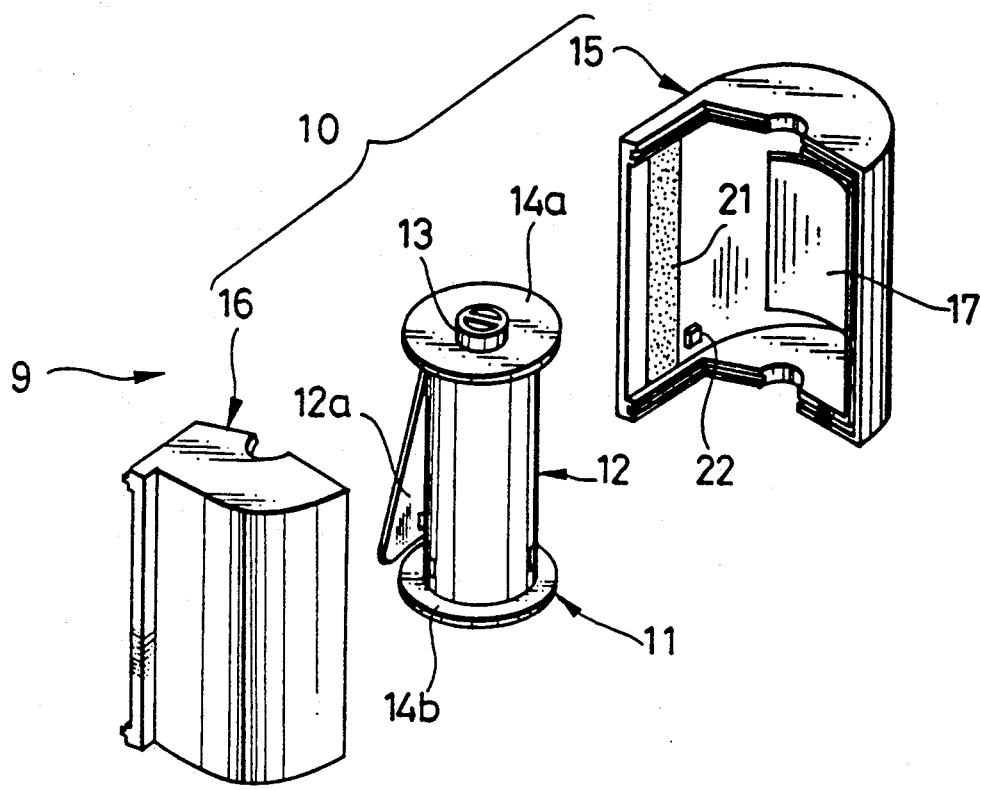
FIG. 1 is an exploded perspective view of a photographic film cassette according to an embodiment of the present invention.

Referring to FIG. 1, a photographic film cassette 9 is constructed of a cassette made of plastics, and a photographic film 12 light-tightly housed within the plastic cassette. This plastic cassette has a cassette shell 10 and a spool 11. The spool 11 is formed with flanges 14a and 14b at opposite ends of a core 13. The film 12 is secured to the core 13 at its one end and wound on the outer periphery of the core 13 between the flanges 14a and 14b. The cassette shell 10 is made of shell halves 15 and 16 and rotatably houses therein the spool 11 on which the film 12 was wound, the shell halves being bonded together using an adhesive agent or ultrasonic waves.

Figure 2:
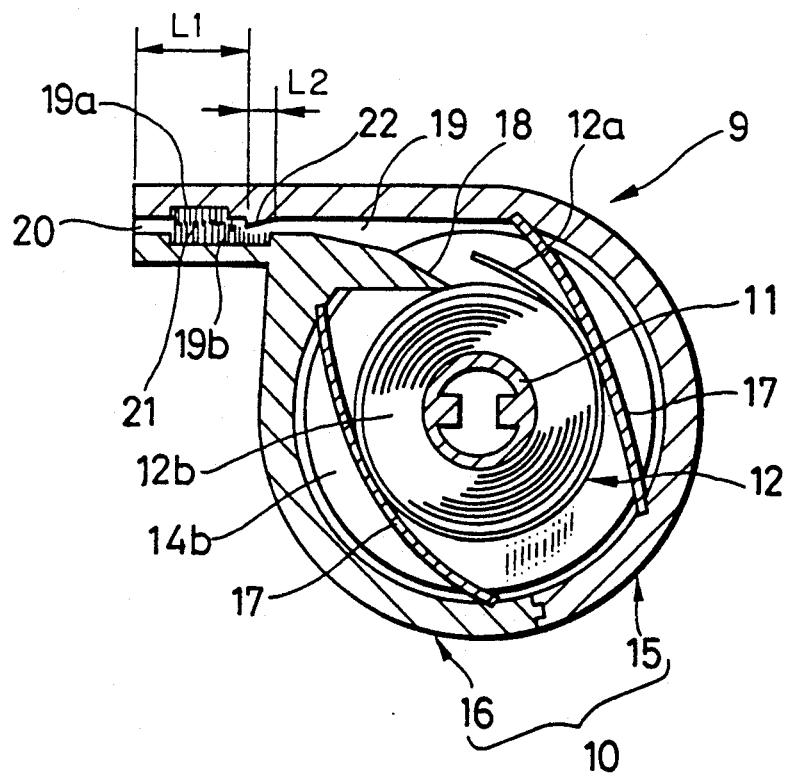
FIG. 2 is a lateral cross section of the film cassette shown in FIG. 1.

Referring to FIG. 2 showing the cross section of the film cassette 9, a pair of resilient plates 17 are mounted within the cassette shell 10. The resilient plates 17 push the outer periphery of a film roll 12b and provide a function to cause the film roll 12b to rotate integrally with the rotation of the spool 11, without loosening the film roll 12b. A separation claw 18 is formed at the inlet of a film passage 19. The separation claw 18 peels off a film leading end 12a from the film roll 12b while the spool 11 together with the film roll 12b rotates, and guides it into the film passage 19.

The surfaces of the opposite ends of the core 13 are made flush with the top and bottom surfaces of the cassette shell 10. Therefore, the core 13 is prevented from being rotated manually by a user to avoid inadvertent feeding of an unexposed film 12 out of a film passage mouth 20. In order not to loosen the wound film roll 12b, the film roll 12b may be squeezed with the flanges 13 and 14 of the spool, or the outermost convolution of the film roll 12b may be pushed by a circular protrusion formed on the cassette shell 10. The shell halves 15 and 16 are each formed with a recess 19a, 19b extending in the lateral direction of the film passage 19. Well-known plushes 21 are attached to the recesses 19a and 19b to trap incident light from the film passage mouth 20, preventing the light from entering the cassette shell 10.

The recess 19a is shorter in the film feeding direction than the recess 19b, and a stop claw 22 is formed downstream of the recess 19a. The stop claw 22 has an inclined surface high on the passage mouth side and low on the separation claw side. The stop claw 22 engages with the film 12 only when the latter is wound. The stop claw 22 is formed at the position apart from the film passage mouth 20 by a distance L1, and has length L2 in the film feeding direction.

Figure 3:
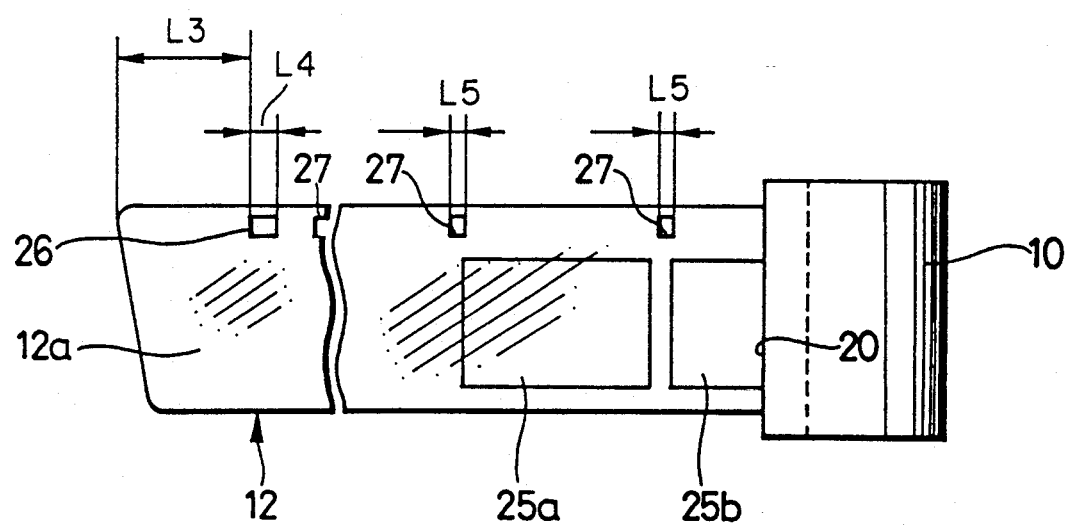
FIG. 3 is a front view showing a film pulled out of the cassette.

As shown in FIG. 3, a stop hole 26 is formed in the film 12 at one side portion thereof in front of the first frame 25a and at the position spaced apart by a length L3 from the end of a film leader 12a. The length L3 is set longer than the length L1 so that the end of the film leader 12a remains protruded from the cassette shell 10 after it has been exposed and wound. Perforations 27 are formed at an interval determined in correspondence with the length of one image frame to feed the film 12 by one frame. The stop hole 26 is formed on the same line passing through the perforations 27. The size of the stop hole 26 is set different from that of the perforations 27, so that the stop claw 22 will engage with the stop hole 26 at the appropriate time as discussed below. The stop claw 22 and stop hole 26 form a means for terminating the film rewinding operation with the film leader being slightly protruded out of the cassette shell. Namely, representing the length of the stop hole 26 in the longitudinal direction of the film 12 as L4, and the length of the perforations 27 as L5, the relationship between lengths is given by $L5 < L2 < L4$.

Figure 4:
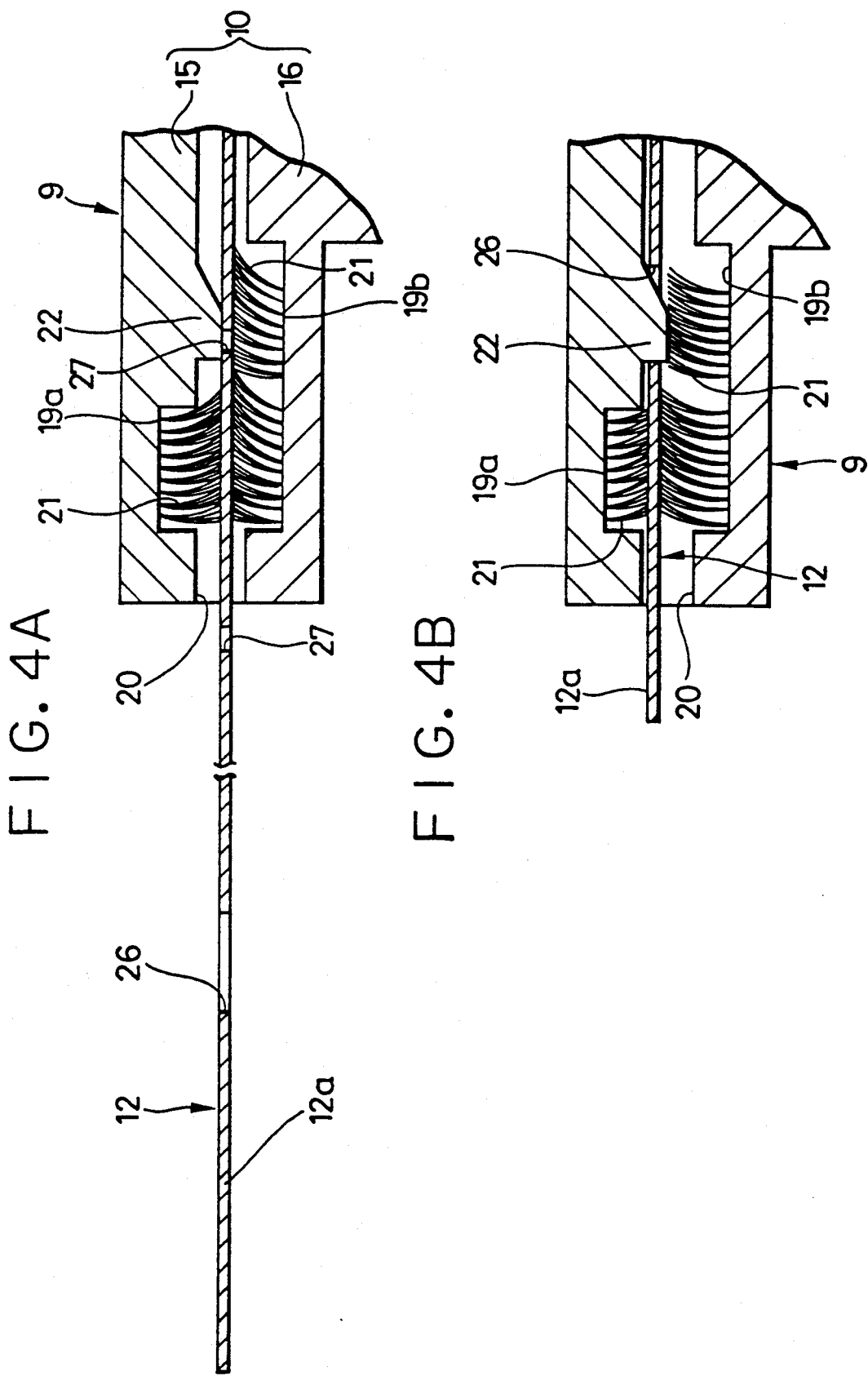
FIG. 4A is an enlarged cross section showing the port section with a film being pulled out.
FIG. 4B illustrates a film after the film rewinding operation.

Before the film 12 has been exposed, the end of the film leader 12a is completely within the cassette shell 10, as shown in FIG. 2. In order to feed the film leader 12a out of the cassette shell 10, the spool 11 is rotated counterclockwise as viewed in FIG. 2. The film roll 12b rotates integrally with the spool 11 without being loosened, since it is pushed by the resilient plates 17. During rotation of the spool 11, the film leader 12a is peeled off from the film roll 12b and directed into the film passage 19. The film leader 12a advances between the plushes 21, and advances out of the film passage mouth 20 of the cassette shell, as shown in FIG. 4A. In this case, the stop claw 22 will not engage with the stop hole 26, but it smoothly passes the stop hole 26.

As the spool 11 is rotated in the opposite direction after taking photographs, the exposed film 12 is wound on the spool 11. During this winding, the stop hole 26 engages with the stop claw 22 immediately before the film leader 12a completely enters the cassette shell 10, maintaining the film leader 12a slightly protruded from the outside of the cassette shell 10 (see FIG. 4B). Thus, the film leader 12a of the unexposed film 12 is not protruded at all from the film passage mouth 20, whereas the film leader 12a of the exposed film 12 is protruded from the film passage mouth 20. It is therefore possible to externally discriminate between the exposed and unexposed films.

Figure 5:
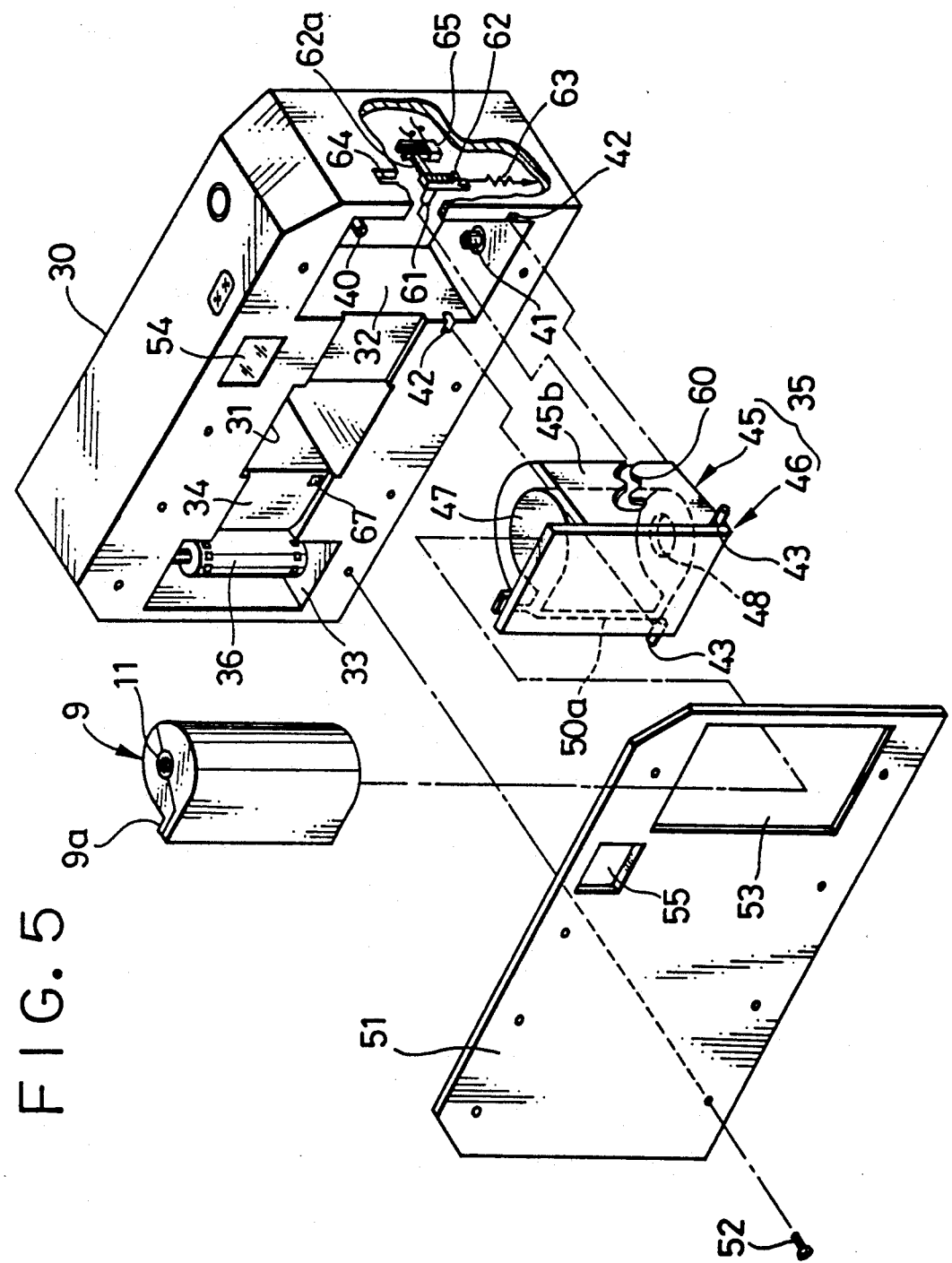
FIG. 5 is an exploded perspective view of a camera using the film cassette shown in FIG. 1.

Next, a camera using the photographic film cassette 9 having the above-described structure will be described. Referring to FIG. 5, there is formed an exposure opening 31 at the back of a camera body 30. A film supply chamber 32 and film take-up chamber 33 are formed at opposite sides of the exposure opening 31, both chambers being operatively coupled via a film passage 34. A cassette holder 35 is placed in and taken out of the film supply chamber 32, and a take-up spool 36 is rotatably disposed within the film take-up chamber 33.

Figure 8:
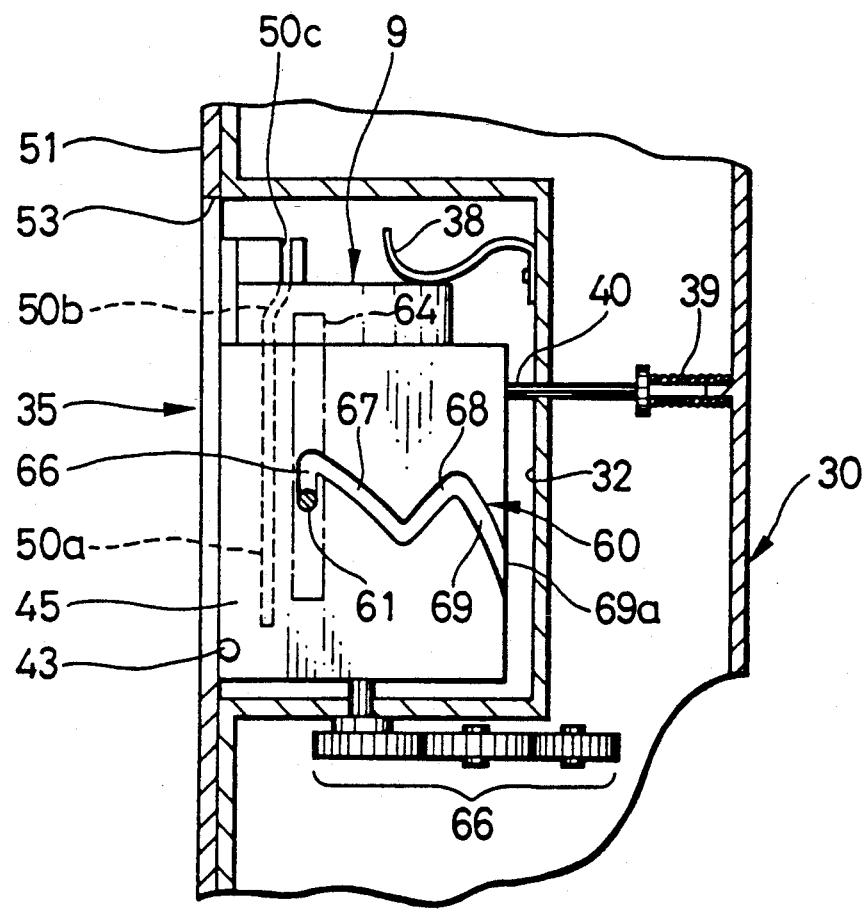
FIG. 8 is a cross section showing the main part of a cassette holder set at the closed position.

As particularly shown in FIG. 8, there are provided within the film supply chamber 32 a push spring 38 for pushing the film cassette 9, a push pin 40 biased by a spring 39, and a fork 41 (see FIG. 9) for engagement with the spool 11 of the film cassette 9. The push pin 40 pushes the cassette holder 35 toward an open position at the outside of the camera body 30. The fork 41 rotates in the normal direction when the film leader 12a is to be let out of the film cassette 9, and in the opposite direction when the exposed film 12 is to be wound back within the film cassette 9. The fork 41 is slidable in the axial direction, and is biased by a spring (not shown) in the direction of protruding it within the cassette holder 35. A pair of recesses 42 (see FIG. 5) is formed in the film supply chamber 32 at the lower right and left sides thereof.

Figure 7:
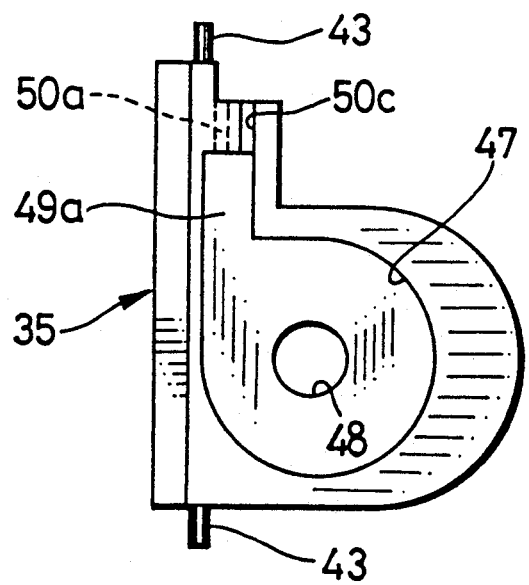
FIG. 7 is a plan view of the cassette holder.

The cassette holder 35 is constructed of an integral member of a cylindrical section 45 and a lid section 46. A pair of pins 43 protrude from the lid section 46 at both sides thereof. The cassette holder 35 is arranged to pivot or swing about the pins 43 to take one of a closed position, open position, and fully open position. The cylindrical section 45 has a cassette receiving chamber 47 into which the film cassette 9 is inserted in the axial direction. An opening 48 is formed in the bottom of the cassette receiving chamber 47, for allowing the fork 41 to enter the opening 48. A recess 49a (see FIG. 7) is also formed in the cassette receiving chamber 47 in order to fit a port section 9a of the film cassette 9 into the recess 49a. The depth of the cassette receiving chamber 47 is set shorter than the axial length of the film cassette 9, so that film cassette 9 can be easily picked up with fingers by gripping the portion of the film cassette 9 protruded from the chamber 47.

Figure 6:
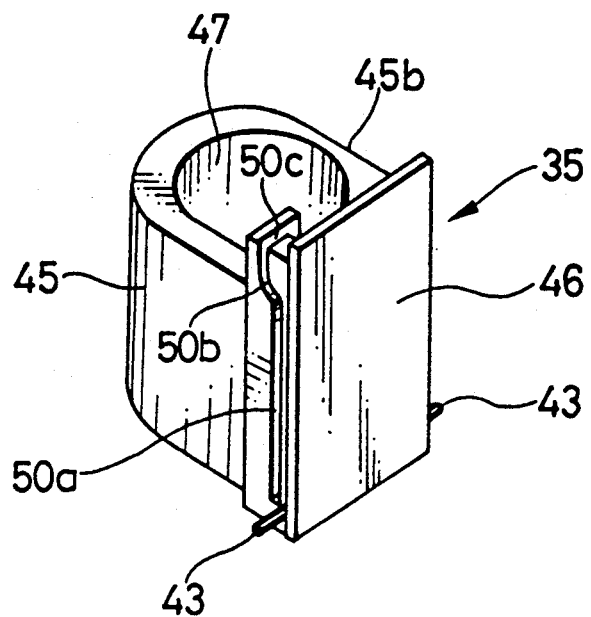
FIG. 6 is a perspective view of a cassette holder.

The cylindrical section 45 is formed with a film feeding slit 50a (see FIGS. 6 and 7) at the position facing on the film passage mouth 20, through which slit the film 12 passes. A blocking portion 45a (see FIG. 9) is formed above the film feeding slit 50a having a film removing slit 50b from which the film leader 12a is pulled out. The film removing slit 50b is curved, with its open end 50c positioned aside the blocking portion 45a. The open end 50c and the straight portion of the film removing slit 50b are different in position in the vertical direction. As a result, when an exposed film cassette, having the film leader 12a protruded therefrom, is attempted to be inserted into the cassette receiving chamber 47, the film leader 12 is intercepted by the blocking portion 45a.

A push plate 51 is used for shielding light at the back of the camera body 30, the push plate 51 being formed with an opening 53 via which the cassette holder 35 is allowed to swing, and a window 55 facing on a finder 54. A known film pressing plate and the like are provided on the inner surface of the push plate 51.

A cam groove 60 of corrugated shape is formed in one flat side 45b of the cylindrical section 45. An operation pin 61 is fitted in the cam groove 60. The operation pin 61 is mounted on an operation lever 62 which is slid upward along a slit 64 against the force of a spring 63, to thereby swing the cassette holder 35 to the closed position, open position, and further to the fully open position (see FIGS. 5, 9 and 10).

As shown in FIG. 8, the cam groove 60 has a first lock groove 66, first guide groove 67, second lock groove 68, and second guide groove 69, starting from the left side. The right end of the second guide groove 69 is open at an open end 69a so that the operation pin 61 is allowed to move in and out of the cam groove 60. This arrangement provides simple assembly of the camera because the cassette holder 35 can be mounted in position after the operation pin 61 is mounted on the camera body 10. The first lock groove 66 extends in the axial direction of the cylindrical section 45. The cassette holder 35 is locked in the closed position in the first lock groove 66, because a wall of the first lock groove 66 pushes the operation pin 61 in a direction vertical to the extension of the slit 64. It is noted that the first lock groove 66 may be slightly inclined against the vertical direction, though the locking function is less tight.

Figure 9:
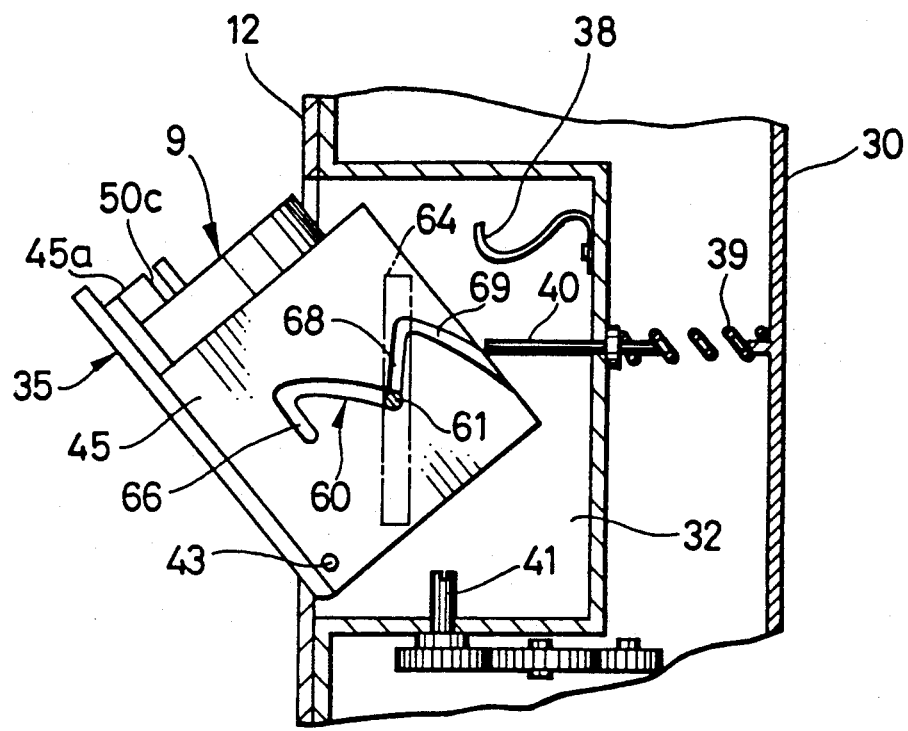
FIG. 9 is a cross section similar to FIG. 8, showing the main part of a cassette holder set at the open position.

When the cassette holder 35 is at the open position as shown in FIG. 9, the second lock groove 68 extends in the direction of relative movement of the operation pin 61, thereby serving to lock the cassette holder 35 in the open position. The first and second guide grooves 67 and 69 have an arc shape concentric with the pins 43, so that the cassette holder 35 can be swung without moving the operation pin 61.

A switch 65 is mounted at the position where it can be actuated by a protrusion 62a of the operation lever 62 (see FIG. 5). When the operation lever 62 takes a position as shown in FIG. 8, i.e., when the cassette holder 35 is at the closed position, the switch 65 is turned on by the protrusion 62a. The switch 65 turns off at the other positions of the cassette holder 35. When the switch 65 turns on, a motor (not shown) starts rotating to rotate the fork 41 via a gear train 66. Reference numeral 67a represents a sensor for photoelectrically detecting the perforations 27 of the film 12.

The cassette holder 35 is mounted on the camera body 30 from the back of the camera body 30 after the latter has been completely assembled. First, the pins 43 of the cassette holder 35 are fitted in the recesses 42 formed in the lower portion of the film supply chamber 32. Next, the push plate 51 is put on the back of the camera body 30 while inserting the cassette holder 35 in the opening 53 of the push plate 51, and is secured to the camera body 30 by screws 52. Then, the operation lever 62 is moved to the highest position and the cassette holder 35 is pushed into the film supply chamber 32, so that the operation pin 61 enters the open end 69a and passes into the cam groove 60.

Next, the operation of the camera will be described. For loading a film, the operation lever 62 is slid upward. Since the cassette holder 35 is being pushed by the push pin 40, the cassette holder 35 swings or pivots counter-clockwise about the pins 43 when the operation pin 61 reaches the uppermost end of the first lock groove 66. Simultaneously with this swing, the operation pin 61 passes the first arc guide groove 67 and enters the second lock groove 68. As a result, the cassette holder 35 stops swinging and is held at the open position extending out of the camera body 30, as shown in FIG. 9. In this condition, the film cassette 9 is loaded in the axial direction into the cassette receiving chamber 47. The opening of the cassette receiving chamber 47 has a shape substantially the same as the cross section of the film cassette 9. Therefore, the film cassette 9 can be loaded only when it is loaded with a particular loading posture, so that the film cassette 9 will not be loaded with the film passage mouth 20 being directed in the opposite direction.

As the cassette holder 35 is pushed into the camera body 30, the fork 41 enters the opening 48 and engages with the spool 11. At the same time, the operation pin 61 enters the first lock groove 66 via the second guide groove 67, so that the operation lever 62 lowers within the slit 64 by the force of the spring 63. As a result, the cassette holder 35 is held at the closed position, as shown in FIG. 8.

When the cassette holder 35 takes the closed position, the switch 65 is actuated by the protrusion 62a and turned on. Therefore, the motor, hence the fork 41 and the take-up spool 36 start rotating. The fork 41 causes the spool 11 of the film cassette 9 to rotate in the film feeding direction, so that as described previously, the film leader 12a is fed out of the film cassette 9. The film leader 12a is guided along the film passage 34 into the take-up chamber 33, and wound on the outer periphery of the take-up spool 36 which rotates slightly faster than the fork 41. During this film initial advance, the sensor 67a counts the number of perforations 27 which have passed. When it is detected that the film has been fed by a length sufficient for the film leader to be wound on the take-up spool 36, rotation of the fork 41 is stopped by means of a clutch mechanism.

After the initial film feeding, the film 12 is wound while the take-up spool 36 is driven. When the sensor 67a counts a predetermined number of passed perforations 27 while the film is wound, the take-up spool 36 is stopped to set the first frame 25a at the back of the exposure opening 31 and waits for taking a photograph. Each time a photograph is taken, the film 12 is fed by one frame to take an image on the frame 25b and so on.

After images for all frame have been taken, the motor automatically starts rotating in the opposite direction to rotate the take-up spool 36 and fork 41 in the opposite direction. While the spool 11 rotates in the opposite direction, the film 12 is wound in the film cassette 9. Thereafter, as described previously, the stop claw 22 engages with the stop hole 26 to intercept the film as it is rewinding. At this time, the load of the fork 41 increases abruptly, which is electrically detected to stop the reverse rotation of the motor.

After the film rewinding, the operation lever 62 is raised to move the cassette holder 35 to the open position as shown in FIG. 9. The film cassette 9 can then be pulled upward out of the cassette holder 35. In this case, although the film leader 12a protrudes out of the film cassette 9, the film cassette 9 can be pulled out while bending the film leader 12a and guiding it from the film removing slit 50b to the opening end 50c. If the exposed film cassette 8 is attempted to be loaded again in the camera, the film leader 12a is intercepted by the blocking portion 45a so that inadvertent loading of the exposed film cassette 9 can be avoided.

Figure 10:
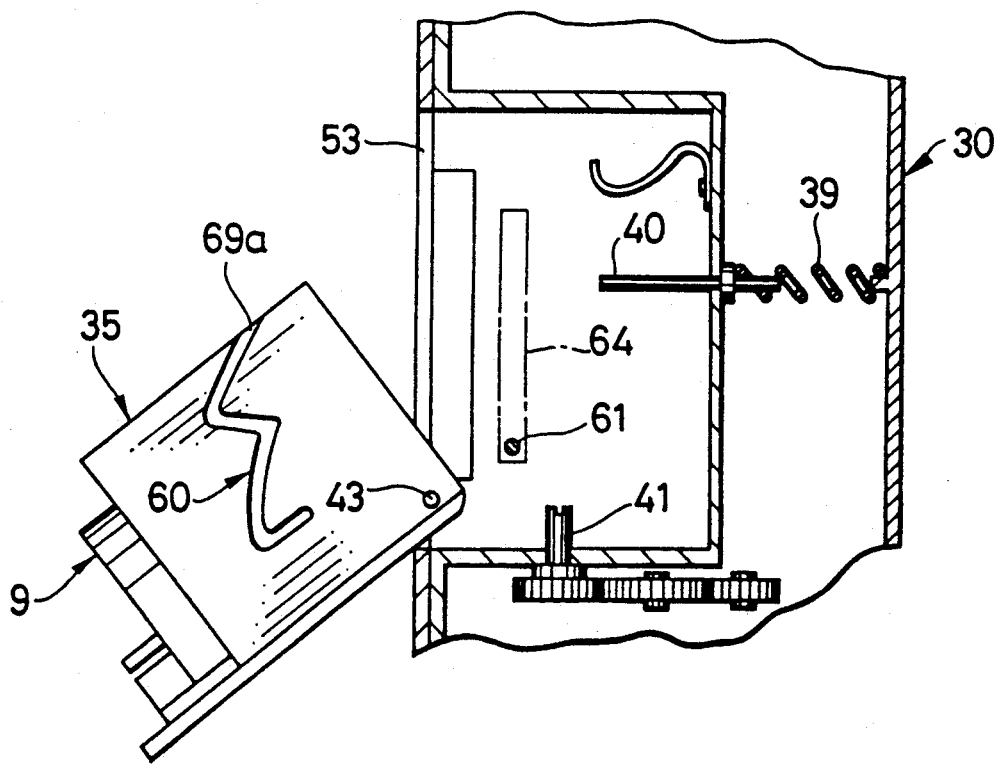
FIG. 10 is a cross section similar to FIG. 8, showing the main part of a cassette holder set at the fully open position.

For checking or repairing the film supply chamber 32, the cassette holder 35 is arranged to be moved backward of the camera body 30 as shown in FIG. 10. Specifically, the operation lever 62 is slid upward to move the operation pin 61 to the upper end of the second lock groove 68. In this condition, the cassette holder 35 is pulled backward of the camera body 30 while the operation pin 61 passes the second guide groove 69 and exits out of the open end 69a. For returning the cassette holder 35 from the fully opened position shown in FIG. 10 back to the closed position, the cassette holder 35 is pushed into the film supply chamber 32 after the operation lever 62 is raised to the upper end. Since the operation pin 61 stays within the motion range of the open end 69a, it enters the second guide groove 69. The cassette holder 35 is further pushed to take the open position shown in FIG. 9, and then to take the closed position.

The open/close mechanism for a cassette holder described above may also be applied to a camera using a film cassette having a non-protruding film leader. As the swing restricting means, the cam groove 60 is used. Instead of the cam groove, a protruded guide may be used. The position of the stop hole 26 of the film 12 may be set different from the line passing through the perforations 27. In this case, the stop claw 22 will not engage with the perforations 27 so that the size of the stop hole 26 may be made the same as that of the perforation 27.

Although the present invention has been fully described by way of the preferred embodiments thereof with reference to the accompanying drawings, various changes and modifications will be apparent to those of working skill in this field. Therefore, unless these changes and modifications otherwise depart from the scope of the present invention, they should be construed as included therein.

What is claimed is:

1. A photographic film cassette having a spool with a film wound thereon and a cassette shell containing the spool in a rotatable manner, wherein, when the spool rotates in a first direction, a leader of the film is let out of the cassette shell, and, when the spool rotates in a second direction during a film rewinding operation, the film is rewound on the spool; said photographic film cassette comprising:

means for terminating the film rewinding operation with said film leader being slightly protruded out of said cassette shell, thereby to provide a visual indication that said photographic film cassette is exposed, said means for terminating the film rewinding operation comprising:

a stop hole formed in said film, said stop hole being formed at a position between an end of said film leader and a first frame of said film; and a stop claw formed on said cassette shell, said stop claw not engaging with said stop hole while said film is advanced, and engaging with said stop hole while said film is rewound on said spool.

2. A photographic film cassette according to claim 1, wherein said stop hole is formed in said film on a line passing through a plurality of perforations used for frame advancement control, and said stop hole has a shape different from said perforations so as to allow said stop claw to engage with only said stop hole.

3. A photographic film cassette according to claim 2, wherein said stop hole and said stop claw are larger in size than said perforations in a feeding direction of said film.

4. A photographic film cassette according to claim 1, wherein said cassette shell includes a cylindrical chamber in which said spool is housed, and a port section, said port section being formed with a film passageway coupling said cylindrical chamber and a film passage mouth.

5. A photographic film cassette according to claim 4, wherein said stop claw is formed on said film passageway.

6. A photographic film cassette according to claim 5, wherein a distance between said film passage mouth and said stop claw is shorter than a distance between said end of said film leader and said stop hole.

7. A photographic film cassette according to claim 6, wherein said stop claw is slanted such that said stop claw is high in height on a side of said film passage mouth and low in height on a side of said cylindrical chamber.

8. A photographic film cassette according to claim 7, further comprising a separation claw, said separation claw protruding from said film passageway to the inside of said cylindrical chamber, and separating said end of said film leader from a film roll coiled on said spool.

9. A photographic film cassette according to claim 8, further comprising a resilient plate for pushing the outermost convolution of said film roll so as not to loosen said film roll while said spool rotates.

10. A photographic film cassette according to claim 9, wherein said cassette shell is constructed of two shell halves.

11. A photographic film cassette according to claim 10, further comprising a plush disposed on said film passageway for trapping light incident from said film passage mouth.

* * * * *